Figure 1:
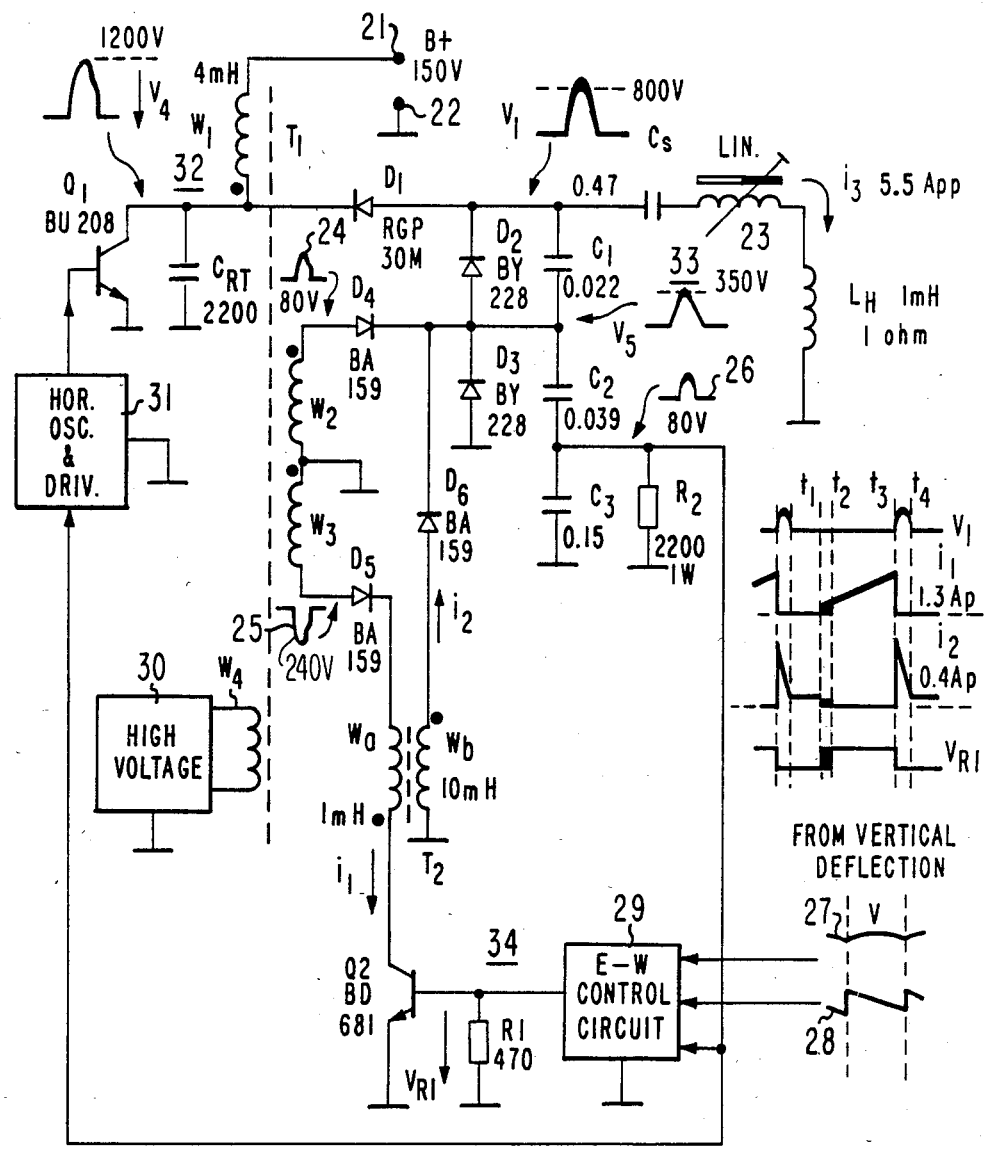

United States Patent [19]

Haferl

[11] Patent Number: 4,594,534
[45] Date of Patent: Jun. 10, 1986

[54] HORIZONTAL DEFLECTION CIRCUIT WITH RASTER DISTORTION CORRECTION

[75] Inventor: Peter E. Haferl, Adliswil, Switzerland

[73] Assignee: RCA Corporation, Princeton, N.J.

[21] Appl. No.: 685,242

[22] Filed: Dec. 21, 1984

[30] Foreign Application Priority Data

Apr. 4, 1984 [GB] United Kingdom ............... 8408692

[51] Int. Cl.$^4$ .................... H01J 29/70; H01J 29; H01J 76
[52] U.S. Cl. .................... 315/408; 315/371
[58] Field of Search .................... 315/370, 371, 408

[56] References Cited

U.S. PATENT DOCUMENTS

| | | | |
|---|---|---|---|
| 4,162,433 | 7/1979 | Van Hattum et al. | 315/408 |
| 4,184,104 | 1/1980 | Shouse, Jr. | 315/371 |
| 4,223,367 | 9/1980 | Zappala | 315/408 |
| 4,381,477 | 4/1983 | Bergmans . | |
| 4,390,818 | 6/1983 | Nagai et al. | 315/408 |
| 4,429,257 | 1/1984 | Haferl . | |

OTHER PUBLICATIONS

U.S. patent application Ser. No. 651,301, by P. E. Haferl, filed 9/17/84, entitled East-West Correction Circuit.

Primary Examiner—Theodore M. Blum
Attorney, Agent, or Firm—Eugene M. Whitacre; Paul J. Rasmussen; Joseph J. Laks

[57] ABSTRACT

A horizontal deflection circuit with raster distortion correction includes a horizontal deflection winding coupled to a first retrace capacitor and an input inductance such as the primary winding of a flyback transformer coupled to a second retrace capacitor. Horizontal switching elements are operated at a horizontal deflection rate for generating current in the inductance and a horizontal scanning current in the deflection winding. During retrace, the horizontal deflection winding and the first retrace capacitor form a first resonant circuit and the input inductance and the second retrace capacitor form a second resonant circuit. One of the switching elements decouples the resonant circuits from each other to minimize the interaction therebetween. A source of raster distortion correction current is coupled to the deflection winding to provide the required scanning current modulation.

10 Claims, 2 Drawing Figures

HORIZONTAL DEFLECTION CIRCUIT WITH RASTER DISTORTION CORRECTION

This invention relates to line deflection circuits with raster distortion correction.

An east-west pincushion raster distortion corrected horizontal deflection circuit is described in U.S. Pat. No. 4,429,257, by P. E. Haferl, entitled VARIABLE HORIZONTAL DEFLECTION CIRCUIT CAPABLE OF PROVIDING EAST-WEST PINCUSHION CORRECTION. In the disclosed circuitry, the flyback transformer winding and the horizontal deflection winding each form separate retrace resonant circuits isolated from one another. This arrangement avoids undesirable interaction between the retrace-loaded resonant circuit of the flyback transformer and the retrace resonant circuit of the deflection winding. A source of pincushion correction current is coupled to the deflection winding via a choke impedance.

In the circuitry disclosed in the Haferl patent, only one of the flyback transformer and deflection retrace resonant circuits is grounded, while the other resonant circuit is left floating above ground during retrace. A retrace pulse voltage is used to provide synchronization information to the horizontal oscillator. If the deflection retrace resonant circuit is grounded, such retrace pulse synchronization information is readily available from the deflection retrace capacitance network. The flyback transformer retrace resonant circuit however, is left floating during retrace, potentially requiring additional circuitry to disconnect the flyback transformer from the B+ voltage supply during retrace.

In an alternative arrangement, the flyback transformer retrace resonant circuit is grounded and the deflection retrace resonant circuit is left floating. In such an arrangement, retrace pulse synchronization information is more readily obtainable from a secondary winding of the flyback transformer than from the deflection retrace resonant circuit. However, since the two retrace resonant circuits are decoupled from one another the synchronization information contained in the flyback transformer retrace pulse voltage may not correspond exactly to the desired synchronization information contained in the deflection retrace pulse voltage.

In U.S. patent application Ser. No. 651,301, filed Sept. 17, 1984, by P. E. Haferl, entitled, EAST-WEST CORRECTION CIRCUIT, both a flyback transformer and a deflection retrace resonant circuit are provided, with the deflection retrace resonant circuit left floating during retrace. Synchronization information for the horizontal oscillator is provided from a secondary winding of the flyback transformer. The flyback transformer input winding and the deflection retrace resonant circuit are coupled together by a relatively small valued retrace capacitor during the retrace interval to enable relatively accurate deflection synchronization information to be obtained from a flyback transformer retrace pulse voltage. The value of this retrace capacitor is chosen so as to minimize transient distortion of the deflection retrace pulse voltage that may be caused by sudden high voltage loading changes.

In accordance with an inventive feature, a raster distortion corrected horizontal deflection circuit is provided having separate flyback transformer and deflection retrace resonant circuits wherein synchronization information for the horizontal oscillator is readily obtainable without the need to otherwise recouple the two resonant circuits. A horizontal deflection winding is coupled to a first retrace capacitance and an input inductance is coupled to a second retrace capacitance. Horizontal switching means is coupled to the deflection winding and to the input inductance and is operated at a horizontal deflection rate for generating current in the inductance and for generating a horizontal scanning current in the deflection winding. During the retrace intervals the horizontal deflection winding and the retrace capacitance form a first resonant circuit and the input inductance and the second retrace capacitance form a second resonant circuit. The horizontal switching means decouples the two resonant circuits from each other to minimize the interaction therebetween. A source of raster distortion correction current is coupled to the deflection winding. In an advantageous way of carrying out the invention, neither of the two resonant circuits are placed in a floating condition during retrace.

Figure 2:
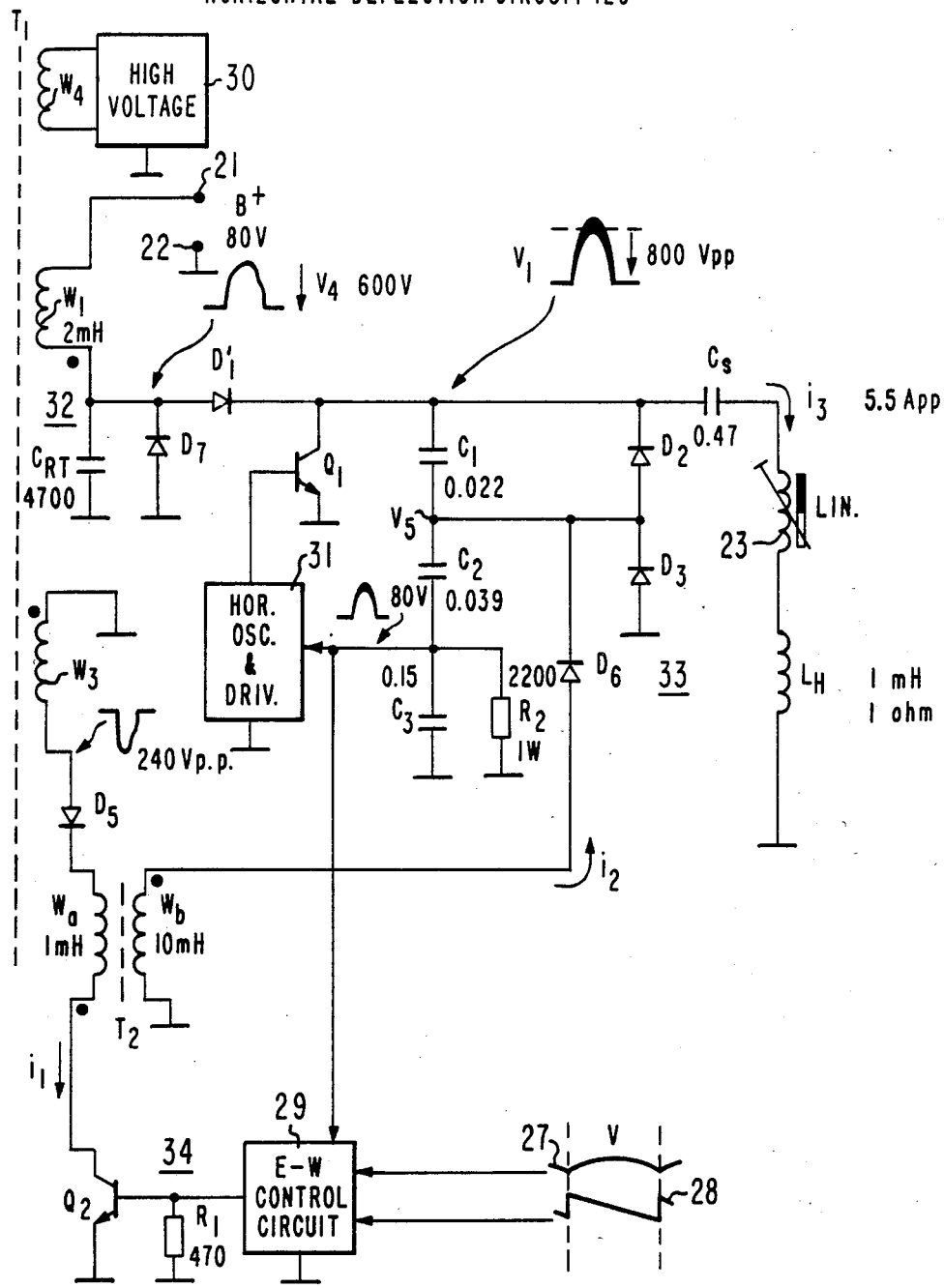

FIG. 1 illustrates a raster distortion corrected horizontal deflection circuit, embodying the invention; and FIG. 2 illustrates still another raster distortion corrected horizontal deflection circuit, embodying the invention.

In raster distortion corrected horizontal deflection circuit 20 of FIG. 1, source of B+ supply voltage and energy is coupled between a terminal 21 and a point reference potential, ground terminal 22. Terminal 21 is coupled to an input inductance, at the primary winding $W_1$ of a flyback transformer $T_1$. The lower end terminal of primary winding $W_1$ is coupled to the collector of a horizontal output transistor $Q_1$ of a horizontal switching means comprising horizontal output transistor $Q_1$, series connected damper diodes $D_2$ and $D_3$, and a disconnect diode $D_1$.

Coupled between the cathode of damper diode $D_2$ and ground is the series arrangement of an S-shaping capacitor $C_s$, a biased linearity correction coil 23 and a horizontal deflection winding $L_H$. Also coupled between the cathode of damper diode $D_2$ and ground is the series connected retrace capacitance network of retrace capacitors $C_1$, $C_2$ and $C_3$.

A horizontal oscillator and driver circuit 31 provides horizontal rate switching signals to the base of horizontal output transistor $Q_1$. Operation of horizontal output transistor $Q_1$ enables current to flow in a primary winding $W_1$ and horizontal scanning current $i_3$ to flow in horizontal deflection winding $L_H$. During the early portion of the horizontal trace interval, damper diodes $D_2$ and $D_3$ conduct horizontal scanning current $i_3$ and conduct current in flyback transformer winding $W_1$ via diode $D_1$. During the latter portion of the horizontal trace interval, horizontal output transistor $Q_1$ conducts current from flyback transformer winding $W_1$ and horizontal scanning current via diode $D_1$.

When horizontal output transistor $Q_1$ becomes cutoff to initiate the horizontal retrace interval, two retrace resonant circuits are formed. A first retrace resonant circuit 33 is formed by horizontal deflection winding $L_H$ and retrace capacitance network $C_1$–$C_3$. This retrace resonant circuit generates a retrace pulse voltage across deflection winding $L_H$ and a retrace pulse voltage $V_1$ at the anode of diode $D_1$, across retrace capacitance network $C_1$–$C_3$.

A second retrace resonant circuit 32 is formed by the input inductance of flyback transformer primary winding $W_1$ and a flyback transformer retrace capacitance $C_{RT}$ coupled between winding $W_1$ and ground. A retrace pulse voltage $V_4$ is developed by flyback transformer retrace resonant circuit 32 across retrace capacitance $C_{RT}$, at the cathode of diode $D_1$.

The amplitude of flyback transformer retrace pulse voltage $V_4$ is greater than the amplitude of deflection retrace pulse voltage $V_1$, thereby reverse biasing diode $D_1$. In this way, diode $D_1$ serves to disconnect or decouple the two retrace resonant circuits 32 and 33 from each other during the retrace interval so that no current flows from flyback transformer winding $W_1$ to deflection retrace resonant circuit 33.

During the horizontal trace interval, energy from the B+ supply source is stored in the input inductance of flyback transformer primary winding $W_1$. This energy is transferred to the flyback transformer retrace resonant circuit 32. The energy replenishes losses sustained in driving the retrace driven load circuits coupled to various ones of the secondary windings of the flyback transformer, such as high voltage circuit 30 coupled to high voltage winding $W_4$.

Beam current loading of flyback transformer retrace resonant circuit 32 by high voltage circuit 30 produces a harmonically distorted retrace pulse voltage $V_4$. Because deflection retrace resonant circuit 33 is decoupled from flyback transformer retrace resonant circuit 32 by means of disconnect diode $D_1$, variations in beam current loading or heavy audio loading of flyback transformer $T_1$ produce no significant distortion of the deflection retrace pulse voltage $V_1$ and the retrace pulse voltage across horizontal deflection winding $L_H$.

A raster distortion correction circuit 34 provides a source of correction current $i_2$ to deflection winding $L_H$ via a diode $D_6$. In addition to providing raster distortion correction such as east-west pincushion correction, current $i_2$ provides the drive power to replenish horizontal deflection losses.

In correction circuit 34, a vertical or field rate parabolic waveform correction signal 27, obtained from the vertical deflection circuit, not illustrated, is coupled to a conventional pulse width modulator east-west control circuit 29. A field rate sawtooth waveform signal 28 provides trapeze distortion correction to control circuit 29. The pulse width modulation is performed on a horizontal rate signal that is synchronized with horizontal deflection by a deflection retrace pulse voltage 26 coupled to the junction of deflection retrace capacitors $C_2$ and $C_3$. The pulse width modulated base drive voltage for a driver transistor $Q_2$, developed by east-west control circuit 29 is illustrated in FIG. 1 by the voltage waveform $V_{R1}$.

To obtain the current $i_2$, energy is stored in the inductance of an east-west pincushion transformer $T_2$ by the current $i_1$ flowing in a winding $W_a$ of the transformer during conduction of driver transistor $Q_2$.

The energy or supply voltage source for transformer $T_2$ is secondary winding $W_3$ of flyback transformer $T_1$. During the latter portion of each horizontal trace interval, transistor $Q_2$ is conductive, producing an upwardly ramping current $i_1$ in winding $W_a$, as noted by studying the waveforms $V_1$, $i_1$, and $V_{R1}$ illustrated in FIG. 1. At the beginning of each horizontal retrace interval, transistor $Q_2$ becomes cutoff by the base drive voltage $V_{R1}$. The reverse biasing of diode $D_5$ is aided by the negative retrace pulse voltage 25 developed at the anode of the diode by flyback transformer winding $W_3$.

With current in winding $W_a$ of transformer $T_2$ abruptly cutoff at the beginning of retrace, the dotted end of winding $W_b$ becomes positive and current $i_2$ is generated in winding $W_b$ by means of energy transfer between windings $W_a$ and $W_b$, as illustrated in FIG. 1 by the current $i_2$ at time $t_3$. Current $i_2$ flows into deflection retrace resonant circuit 33 at the junction of deflection retrace capacitors $C_1$ and $C_2$ to replenish deflection losses and to provide the needed east-west pincushion correction modulation of horizontal scanning current $i_3$. The amplitude of correction current $i_2$ at the beginning of horizontal retrace varies in an east-west manner to likewise vary the horizontal scanning current $i_3$ and the deflection retrace pulse voltage $V_1$.

Time $t_2$ of the waveforms of FIG. 1 indicates the instant within each horizontal trace interval that transistor $Q_2$ turns on when the top and bottom raster lines are being scanned, and time $t_1$ indicates the time when the center raster lines are being scanned. Advancing the position of the entire interval $t_1$–$t_2$ to a point early within the horizontal trace interval, increases the peak value of correction current $i_2$. The amplitude of scanning current $i_3$ is thereby increased, resulting in increased raster width. A decrease in scanning current amplitude occurs when the position of the interval $t_1$–$t_2$ is retarded.

The greater the amount of energy that is stored in pincushion transformer $T_2$ during each horizontal trace interval, the higher the resulting amplitudes of correction current $i_2$, deflection retrace pulse voltage $V_5$ developed at the junction of retrace capacitors $C_1$ and $C_2$, deflection retrace pulse voltage $V_1$ and scanning current $i_3$. It should be noted that correction current $i_2$ does not decrease to zero at time $t_4$, the end of the horizontal retrace interval. Thus after time $t_4$ and until driver transistor $Q_2$ becomes conductive, current $i_2$ circulates in winding $W_b$ via the ground connections provided by conduction of the appropriate one or both of damper diodes $D_2$ and $D_3$. Because correction current $i_2$ does not decrease to zero within the horizontal retrace interval, retrace time modulation of the deflection retrace pulse voltages is avoided. Such modulation could have been produced had diode $D_6$ become nonconductive during horizontal retrace.

During the startup phase of circuit operation, B+ supply rail voltages for such circuits as horizontal oscillator and driver 31 and east-west control circuit 29 may be provided in a conventional manner, not illustrated in FIG. 1. Upon startup of horizontal oscillator and driver 31, horizontal output transistor $Q_1$ begins switching operation to generate flyback transformer retrace pulse voltages in the windings of flyback transformer $T_1$.

Because diode $D_1$ blocks power transfer to deflection retrace resonant circuit 33 from flyback transformer retrace resonant circuit 32, the switching operation of horizontal output transistor $Q_1$ cannot, by itself, initiate the development of deflection retrace pulse voltages and horizontal scanning current. Without the generation of deflection retrace pulse voltages, such as voltage 26, typical east-west control circuits that do not incorporate free running oscillators are unable to generate the horizontal rate switching voltage $V_{R1}$ required for driver transistor $Q_2$. Absent the switching of driver transistor $Q_2$, no energy can flow to deflection retrace resonant circuit 33 to initiate the buildup of deflection retrace pulse voltages and horizontal scanning current. A prior art solution in such a situation is to provide a source of startup current from a voltage supply such as a main rectified supply and inject the current into the current path of S-shaping capacitor $C_S$. Such an arrangement is shown in U.S. Pat. No. 4,362,974, by W. F. W. Dietz, entitled, COMMUTATED SWITCHED REGULATOR WITH LINE ISOLATION FOR TRANSISTOR DEFLECTION.

In accordance with an inventive feature, horizontal deflection circuit 20 of FIG. 1 avoids the need for a separate startup supply to transfer energy to deflection retrace resonant circuit 33. Even though flyback transformer $T_1$ does not transfer power to deflection winding $L_H$ during steady-state operation, it does advantageously transfer power during the startup interval. The retrace pulse voltage 24 developed by winding $W_2$ of flyback transformer $T_1$ is rectified by a diode $D_4$ and coupled to the junction of deflection retrace capacitors $C_1$ and $C_2$. Winding $W_2$ provides initial deflection power to generate the deflection retrace pulse voltage 26 for starting up east-west control circuit 29 and for providing initial synchronization information to horizontal oscillator and driver circuit 31. During steady-state operation the deflection retrace pulse voltage $V_5$ is of a greater amplitude than that of flyback transformer retrace voltage 24, thereby cutting off diode $D_4$ and disconnecting winding $W_2$ from deflection retrace resonant circuit 33.

Several advantages are provided by the inventive raster distortion corrected horizontal deflection circuit 20 of FIG. 1. For example, the amplitude of horizontal scanning current $i_3$ becomes generally independent of B+ voltage variations at terminal 21. The impedance of horizontal deflection winding $L_H$ need not be matched to the value of the B+ voltage chosen at terminal 21. Beam current loading of flyback transformer $T_1$ does not produce scanning current disturbances known as "Mäusezähne," or mouseteeth wiggles that may otherwise be observed when displaying a white crosshatch line pattern. Because the scanning current amplitude is relatively independent of the B+ voltage, a very large range of raster width adjustment is available.

Modifications to the circuit of FIG. 1 are possible. For example, the junction of diodes $D_6$ and $D_4$, instead of being connected to the junction of diodes $D_2$ and $D_3$ may be connected to the junction of diodes $D_1$ and $D_2$. Capacitor $C_2$ and diode $D_3$ may be omitted, with the anode of diode $D_2$ being grounded and the bottom plate of capacitor $C_1$ being connected directly to the top plate of capacitor $C_3$. The junction of diodes $D_4$ and $D_6$ would then be connected to the junction of diodes $D_1$ and $D_2$.

FIG. 2 illustrates a raster distortion corrected horizontal deflection circuit 120 similar to the circuit of FIG. 1. Circuit 120 may be advantageously used when the available B+ voltage is lower than the average trace voltage applied to horizontal deflection winding $L_H$ and when yoke transformation is not desired. Items in FIGS. 1 and 2 similarly identified function similarly or represent similar quantities.

In FIG. 2, horizontal output transistor $Q_1$ is directly connected to S-shaping capacitor $C_s$ and horizontal deflection winding $L_H$. Flyback transformer winding $W_1$ is coupled to horizontal output transistor $Q_1$ via disconnect diode $D_1'$. Diode $D_1'$ of FIG. 2 is poled in the sense opposite that of corresponding diode $D_1$ of FIG. 1.

To enable diode $D_1'$ to decouple flyback transformer retrace resonant circuit 32 from deflection retrace resonant circuit 33 during retrace, horizontal deflection circuit 120 is designed to produce a deflection retrace pulse voltage $V_1$ that is greater in amplitude than that of flyback transformer retrace pulse voltage $V_4$. This produces the required cutoff of diode $D_1'$ during retrace.

With flyback transformer retrace capacitor $C_{RT}$ being connected to the anode of diode $D_1'$ and damper diodes $D_2$ and $D_3$ being connected at the cathode of diode $D_1'$, damper action is no longer available to flyback transformer retrace resonant circuit 32 by diodes $D_2$ and $D_3$. A separate damper diode $D_7$ is coupled across capacitor $C_{RT}$ and provides to the flyback transformer retrace resonant circuit the required damper action at the end of retrace. Diode $D_7$ thereby further isolates retrace resonant circuits 32 and 33 from one another near the end of their respective retrace intervals.

Diode $D_1'$ of FIG. 2 conducts lower amplitude flyback transformer current during horizontal trace than does the corresponding diode $D_1$ of FIG. 1.

Because diode $D_1'$ is poled to conduct current from flyback transformer winding $W_1$ to deflection retrace resonant circuit 33, the B+ supply source at terminal 21 provides startup current to charge retrace resonant circuit 33 via the diode during the startup interval. Flyback transformer winding $W_2$ and diode $D_4$ of FIG. 1 therefore need not be used in the circuit of FIG. 2. In steady-state operation, the startup current path to deflection retrace resonant circuit 33 from the B+ supply source is disabled by the disconnect action impressed on diode $D_1'$.

By providing a horizontal switching arrangement that includes a blocking or disconnect element, such as diode $D_1$ or $D_1'$, both flyback transformer retrace capacitor $C_{RT}$ and deflection retrace capacitance network $C_1$–$C_3$ may be ground connected and their retrace pulse voltages ground referenced. Deflection synchronization retrace pulses that are ground referenced are readily available from the deflection circuitry without requiring the flyback transformer circuitry to AC float above ground during retrace.

The resonant frequencies or retrace times of flyback transformer retrace circuit 32 and deflection retrace circuit 33 are selected to maintain separation between the two circuits and to ensure the diode $D_1$ of FIG. 1 and diode $D_1'$ of FIG. 2 do not conduct during retrace. In FIG. 1, the retrace frequency of circuit 32 may be selected lower than that of circuit 33, resulting in the retrace time for retrace pulse voltage $V_4$ being longer than that of retrace pulse voltage $V_1$. In FIG. 2, the retrace frequency of circuit 32 may be selected higher than that of circuit 33 resulting in the retrace time for retrace pulse voltage $V_4$ being shorter than that of retrace pulse voltage $V_1$.

Because the flyback transformer and deflection retrace resonant circuits are isolated from each other by diode $D_1$ or $D_1'$, only the flyback transformer retrace resonant circuit provides energy to high voltage load 30. Therefore, the primary inductance of flyback transformer $T_1$ must be sufficiently low that enough energy is stored in the transformer at the end of trace to obtain a sufficiently low equivalent high voltage source impedance under peak loading conditions.

An advantage of having both retrace resonant circuits 32 and 33 ground referenced is that the correction and energy supply current $i_2$ is injected directly into the deflection retrace circuit 33 and not via the flyback transformer circuit. No harmonics of the flyback transformer current oscillation is developed across winding $W_b$ of transformer $T_2$, thereby enhancing the isolation between the two retrace resonant circuits.

What is claimed is:

1. A line deflection circuit comprising:
   a source of direct current supply voltage;
   a flyback transformer including a first winding direct current coupled to said source and a second winding coupled to a load circuit;
   a line deflection winding;
   a first retrace capacitance coupled to said line deflection winding;
   a second retrace capacitance coupled to said first winding;
   switching means coupled to said line deflection winding and to said first winding and operable at a line deflection rate for generating a line scanning current in said deflection winding and for applying said direct current supply voltage to said first winding to store energy therein, operation of said switching means defining line trace and retrace intervals such that during said retrace intervals said line deflection winding and said first retrace capacitance form a first resonant circuit to generate a first pulse voltage and said first winding and said second retrace capacitance form a second resonant circuit to generate a second pulse voltage that transfers energy stored in said first winding to said load circuit, said switching means decoupling the two resonant circuits from each other to minimize the interaction therebetween during loading by said load circuit; and
   a supply inductance coupled to said flyback transformer and to said deflection winding and having said first pulse voltage developed at a first terminal of said supply inductance and said second pulse voltage developed at a second terminal of said supply inductance for generating a supply current to replenish losses sustained by said deflection winding.

2. A line deflection circuit according to claim 1 wherein neither of the two resonant circuits are placed in a floating condition during said retrace intervals by their connection to a point of common reference potential.

3. A line deflection circuit according to claim 2 including means coupled to said supply inductance for modulating said supply current in accordance with a raster distortion correction signal to concurrently modulate said line scanning current.

4. A line deflection circuit according to claim 1 wherein said switching means includes a horizontal output transistor coupled to one of said line deflection winding and first winding via a disconnect device that decouples the two resonant circuits during said retrace intervals.

5. A line deflection circuit according to claim 4 wherein said switching means includes a first damper device coupled to said first retrace capacitance and a second damper device coupled to said second retrace capacitance.

6. A line deflection circuit according to claim 5 wherein the amplitude of the first pulse voltage is lower than the amplitude of the second pulse voltage.

7. A line deflection circuit according to claim 2 including a line deflection oscillator coupled to said switching means and having a synchronizing input coupled to said first resonant circuit for synchronizing operation of said switching means in accordance with the pulse voltage developed by said first resonant circuit.

8. A line deflection circuit according to claim 1 wherein said supply inductance comprises a supply transformer having a primary winding that includes said second terminal coupled to said flyback transformer and a secondary winding that includes said first terminal, and further including a controllable switch coupled to said primary winding and being conductive during said trace intervals for developing said second pulse voltage at said second terminal during said trace intervals, said supply current flowing in said secondary winding during said retrace intervals.

9. A line deflection circuit according to claim 3 wherein said modulating means comprises a switching element responsive to a line rate signal and to a field rate rastor distortion correction signal.

10. A line deflection circuit according to claim 6 including a third winding of said flyback transformer coupled to said first resonant circuit via a rectifier to provide start-up current thereto.

* * * * *